Nov. 14, 1944.   F. A. DE LANO   2,362,686
COUPLING
Filed Jan. 12, 1943
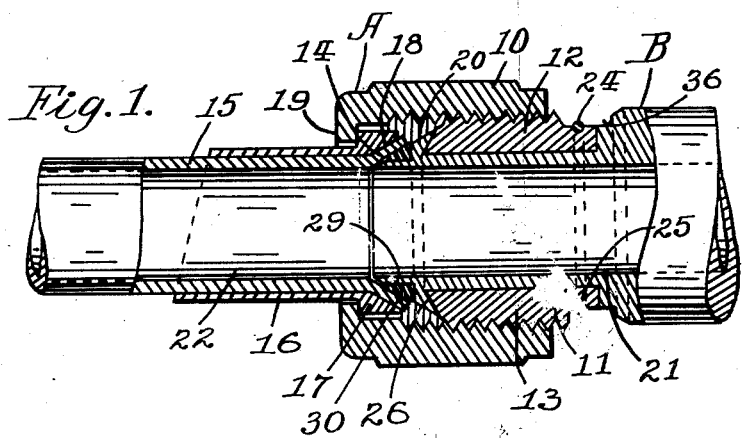
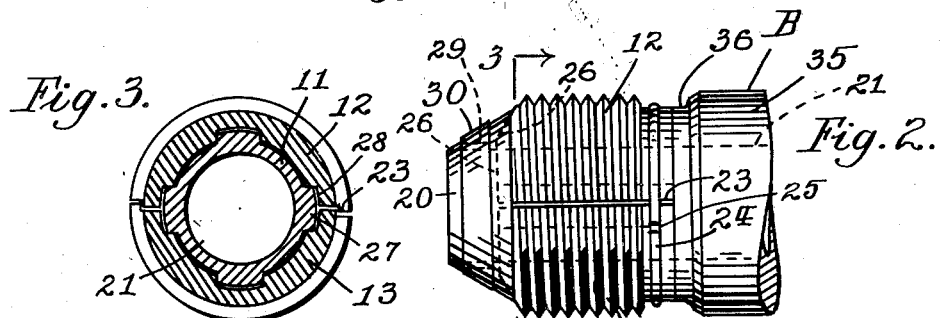
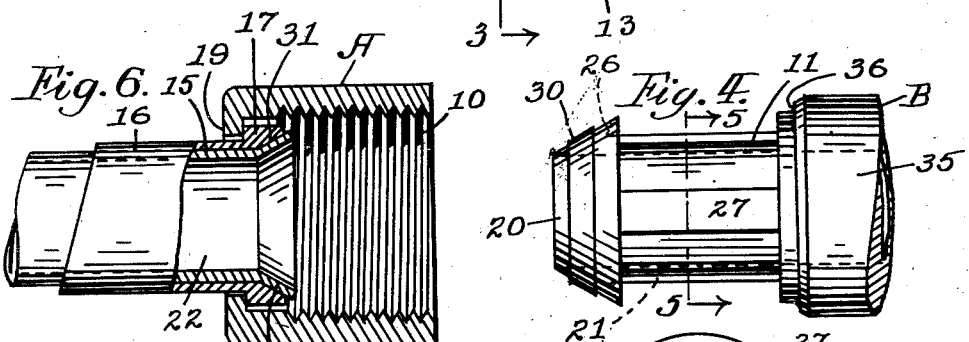
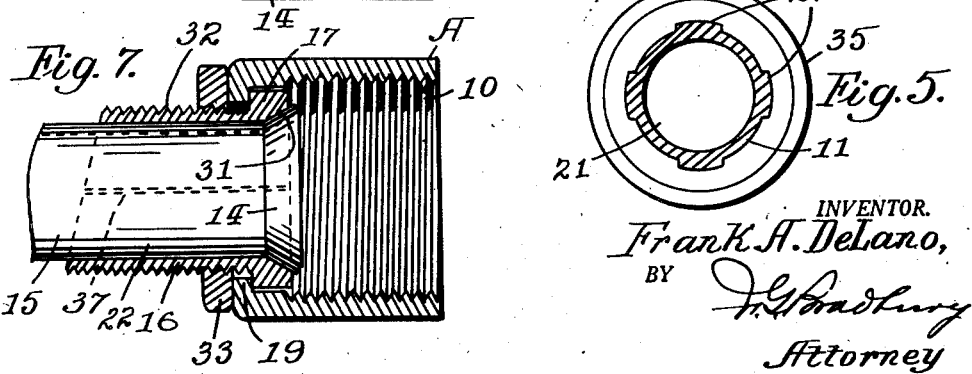
INVENTOR.
Frank A. DeLano,
BY
T. G. Bradbury.
Attorney Patented Nov. 14, 1944

2,362,686

UNITED STATES PATENT OFFICE 2,362,686

COUPLING

Frank A. De Lano, Los Angeles, Calif.

Application January 12, 1943, Serial No. 472,094

4 Claims. (Cl. 285—86)

My invention relates to improvements in tube couplings and especially to that type wherein a flared end portion of one section of tubing is tightly coupled to the end portion of an adjacent section. With couplings of this general type heretofore produced, leaks frequently occur and parts of the coupling work loose, due to vibration, bending stresses and strains. Especially is this the case when couplings are employed to connect pipes and other ducts in aeroplanes, automobiles, pumps and other motive and hydraulic mechanism. It is therefore the primary object of this invention to provide an improved coupling, the parts of which when coupled will under heavy interior fluid pressure produce a leakproof joint and at the same time withstand vibration, jar, and other movement without leaking or working loose. Another object is to provide a structure in which an efficient packing element is applied in such manner between the abutting surfaces held by the coupling as will spread evenly over and between the ends of the tubing and seal the joint therebetween. Another object is to provide an improved structure, the parts of which can be easily assembled and connected. A further object is to provide a structure by which certain of the threaded parts when worn or damaged can be renewed from time to time without having to replace any of the remaining elements of the coupling. Among still further objects are maximum simplicity of construction and effectiveness in use.

In the drawing, Fig. 1 is a longitudinal sectional view of my improved coupling; Fig. 2 is a side elevational view of the male element of my improved coupling; Fig. 3 is a sectional view taken approximately on line 3—3 of Fig. 2; Fig. 4 is a side elevational view of the male element when the split threaded slip members thereof are removed; Fig. 5 is a section taken on line 5—5 of Fig. 4; Fig. 6 is a longitudinal sectional view of the female fitting of my improved coupling, and Fig. 7 is another longitudinal sectional view of the female member indicating a knurled engaging surface between the tube and sleeve elements thereof to prevent inter-revolution therebetween and showing the sleeve element threaded and locked upon the nut element by a lock nut.

My improved coupling comprises a female fitting A having an internally threaded rotatable nut 10, and a male member B, having a cylindrical neck 11, which through the medium of externally threaded slips 12 and 13, engaged thereon, is adapted to be connected through screw threaded engaging means with the female member, to join two coupling members of a duct endwise together, one of which may be the annular flared end 14 of a tube 15. As shown a thin packing sleeve 16 is slipped over the end of the tube 15 and has an annular shoulder 17 and an inwardly tapering annular seat 18. The flared end 14 of the tube seats tightly in the tapering seat of the packing sleeve and the annular shoulder 17 is engaged by and swiveled in the inner annular flange 19 of the nut. The nut is adapted to be revolved to tighten or loosen on the sleeve 16 by a wrench or other suitable means applied to its outer surface and said surface may be circular, flat sided or provided with any other suitable well known wrench engaging means.

The male member B may be a fitting of any desired type forming the longitudinally opposed tubular member or duct of a couple to be connected. This fitting is formed with the longitudinal cylindrical neck 11, which terminates forwardly in a forwardly tapering annular head 20. This tapering head coincides with and snugly seats in the socket which is formed by the flaring end 14 of the tube 15 to connect the ducts 21 and 22 endwise when the male and female members are clamped by screwing together. An externally threaded collar is split longitudinally at 23 into the pair of segmental slips 12 and 13, which are loosely proportioned and assembled circumferentially on the neck 11, said slips being retained on the neck by the split resilient clasp 24, which engages the slips in an annular groove 25, and by the annular undercut or shoulder 26 in the rearward end of the head 20. The slips are retained from revolving on the neck 11 by any suitable means, such as longitudinal keys 27 (see Fig. 3), which are integral with the neck and which engage in suitable corresponding keyways 28 in the slips 12 and 13. The threaded slips provide readily renewable threaded members for engagement by the nut without having to renew any of the remaining elements of the structure. The nut 10 is adapted to be turned into engagement over the threaded slips 12 and 13 to draw the forwardly tapering head 20 into the socket formed by the flaring end 14 of the tube 15.

For the purpose of forming a durable and effective seal, the surface of the tapering head is provided with an annular seat 29 in which is seated, preferably under resilient tension, an elastic packing annulus 30 which, when compressed spreads and flows evenly under compression delivered by screwing the nut tightly on the male member. This packing annulus may be composed of neoprene, rubber, compressed fiber, plastic, or other suitable, preferably elastic material, and is normally of triangular shape in cross section to provide a broad sealing surface. It may however be of less effective shape in cross section such as circular, in which event its seat would be semi-circular or it may be of any other suitable shape.

When desired the tapered end surface 31 of the sleeve 16, as indicated in Fig. 7, may be roughened by knurling or it may be of other suitable construction to engage the flaring end of the tube 16 and prevent inter-revolution between the sleeve 16 and the tube 15, when the nut 10 is revolved and tightened. Also the body of the sleeve 16 may when desired be threaded at 32 and the sleeve and nut body 10, clamped together by the lock nut 33. This lock nut 33 also supplements the force of the shoulder 17 against the flange 19 of the nut to assist in preventing rotating movement between the nut 10 and sleeve. The body 35 of the male member B, may be provided with an annular channel 36, when desired, to receive and conveniently retain the split clasp 24 when the slips 12 and 13 are being replaced. Also the sleeve 16 may be split such as at 37 (Fig. 7), and its parts assembled on the tubing 15 when desired, the nut 38 in such event functioning to draw the segments of the sleeve tightly clasped together over the tubing 15.

It will be understood that the parts of the coupling are so proportioned that the tapering head of the male member will seat snugly endwise in the conical inner surface of the forwardly flaring end of the tube, with the male and female members co-axial, and that the resilient packing annulus 30 is adapted to spread evenly when compressed to produce an efficient fluid tight connection which will withstand hard usage without leaking. My improvement also provides a coupling, which is adapted for use in air, gas, gasoline, and other fluid conducting lines and is particularly useful in various hydraulic actuating devices.

It is obvious that many changes may be made in the details of construction without departing from the spirit of the invention as set forth in the appended claims.

I claim:

1. In a tube coupling, a female member having a tube provided with a flared end forming a tapering seat, a sleeve in which said tube is held having an annular outer shoulder in which the flared end of said tube is seated, and an internally threaded nut having an inner flange swiveled back of the shoulder on said sleeve with the flared end of said tube held within the inner portion of the nut, and a male tubular fitting having a cylindrical neck and a forwardly tapering head portion on said neck adapted to snugly seat within the flaring end of said tube, and an externally threaded collar on said neck adapted to be threadedly engaged by said nut to clamp the male and female members together with said tapered portions tightly seated, said collar being split longitudinally into segmental slips and engaged at one end by an undercut in said head, and a retainer for holding said slips clasped on said neck.

2. A tube coupling, comprising, male and female separable body members adapted to be clamped by screwing together, the female member having an internally threaded portion, a tube provided with a flared end forming a tapered seat within said female member and a sleeve over the tube having an annularly shouldered end in which the flared end of the tube is snugly seated and cooperating with the threaded female body member to produce a swivel connection therebetween, and the male body member having a duct portion, a neck on said duct portion, a forwardly tapering head on said neck adapted to snugly fit within the flaring end of the tube of the female body member to produce a tight connection, externally threaded segmental slips removably mounted upon said neck and engaged by their forward ends by said head, and means for clasping the rearward ends of said slips on said neck, said slips and said neck being keyed together to prevent inter-revolution, and said slips threadedly cooperating with the threaded portion of the female member to assist in clamping the male and female members together with the flared end of said tube and the tapering end of said head tightly connected.

3. A pipe coupling, comprising, male and female threaded body members by which they may be clamped by screwing together, the female member having a tube provided with a flared inner end forming a tapered seat within said member, a sleeve closely enveloping the tube having an annularly shouldered inner end and an externally threaded portion projecting outwardly from the female body member, a lock nut threadedly engaged on the outwardly extended portion of said sleeve and clamping the sleeve with the tube therein on said female body member, and the male member having a tapered annular inner head adapted to snugly seat within said tapered seat of said tube when the male and female body members are clamped together.

4. In a structure as defined in claim 2, the tapering head of the male member which cooperates with the flaring end of the tube of the female member having an annular channel in its tapering surface and a resilient packing element held in said channel and adapted to be compressed and flow evenly to produce an expansible leakproof joint between the male and female members.

FRANK A. DE LANO.